(12) United States Patent
Groitzsch et al.

(10) Patent No.: US 7,763,339 B2
(45) Date of Patent: Jul. 27, 2010

(54) NONWOVEN FABRICS WITH HIGH FLUID ABSORPTION CAPACITY AND A REGULAR STRUCTURE, PROCESS FOR THEIR PRODUCTION, AND THEIR USE

(75) Inventors: Dieter Groitzsch, Hirschberg (DE); Oliver Staudenmayer, Weinheim (DE)

(73) Assignee: Carl Freudenberg KG, Weinheim (DE)

( * ) Notice: Subject to any disclaimer, the term of this patent is extended or adjusted under 35 U.S.C. 154(b) by 461 days.

(21) Appl. No.: 10/190,649

(22) Filed: Jul. 8, 2002

(65) Prior Publication Data
US 2003/0039807 A1    Feb. 27, 2003

(30) Foreign Application Priority Data
Jul. 16, 2001    (DE) ................. 101 33 772

(51) Int. Cl.
*B32B 5/26* (2006.01)

(52) U.S. Cl. .............. 428/141; 428/174; 428/175; 428/176

(58) Field of Classification Search ............ 428/152, 428/167, 171, 141, 174, 175, 176
See application file for complete search history.

(56) References Cited

U.S. PATENT DOCUMENTS

| | | | | |
|---|---|---|---|---|
| 3,616,157 A | * | 10/1971 | Smith | 428/171 |
| 3,816,228 A | * | 6/1974 | Stumpf | 428/88 |
| 3,965,518 A | * | 6/1976 | Muoio | 15/104.93 |
| 4,525,407 A | * | 6/1985 | Ness | 428/138 |
| 4,720,415 A | * | 1/1988 | Vander Wielen et al. | 428/152 |
| 4,847,134 A | * | 7/1989 | Fahrenkrug et al. | 428/138 |
| 4,861,652 A | * | 8/1989 | Lippert et al. | 428/152 |
| 4,883,549 A | * | 11/1989 | Frost et al. | 156/161 |
| 5,576,090 A | * | 11/1996 | Suzuki | 428/152 |
| 5,626,944 A | * | 5/1997 | Rasmussen | 428/172 |
| 6,277,469 B1 | | 8/2001 | Wildeman | |
| 6,562,740 B1 | * | 5/2003 | Todt | 442/149 |
| 6,599,384 B2 | * | 7/2003 | Milner et al. | 156/252 |
| 6,723,416 B1 | * | 4/2004 | Groitzsch et al. | 428/141 |
| 6,803,334 B2 | * | 10/2004 | Mizutani et al. | 442/394 |

FOREIGN PATENT DOCUMENTS

| | | |
|---|---|---|
| CA | 2293362 | 9/1999 |
| DE | 19523497 | 1/1997 |

(Continued)

*Primary Examiner*—D. Lawrence Tarazano
*Assistant Examiner*—Matthew D Matzek
(74) *Attorney, Agent, or Firm*—Kenyon & Kenyon LLP

(57) ABSTRACT

A three-dimensionally structured fiber fabric has a high fluid absorption capacity of at least 5 g fluid per g of fiber fabric and elevations and depressions that occur alternately and regularly with reference to the fabric plane, which includes at least one nonwoven fabric layer and a shrunk fabric bonded to it. The bond between the nonwoven fabric layer and the shrunk fabric has been produced by hot bonding, and the hot bonding occurred at least perpendicular to the direction of the greatest shrinkage of the shrunk fabric, in the form of regularly arranged lines. Furthermore, spaces have formed between the nonwoven fabric layer and the shrunk fabric, at the alternately occurring elevations and depressions, which spaces promote the fluid absorption capacity of the fabric. These fabrics may be used as wiping cloths, wet wipes, as fluid dispensers for cleaning or for applying fluids, etc.

10 Claims, 16 Drawing Sheets

FOREIGN PATENT DOCUMENTS

| | | |
|---|---|---|
| DE | 199 00 424 | 7/2000 |
| EP | 0556749 | 5/1997 |
| EP | 0 789 793 | 8/1997 |
| EP | 0 814 189 | 12/1997 |
| EP | 0 919 212 | 6/1999 |
| EP | 0863240 | 7/2002 |
| JP | 04312431 | 11/1992 |
| JP | 09111631 | 4/1997 |
| JP | 09158022 | 6/1997 |
| WO | WO 96/14457 | 5/1996 |
| WO | WO 98/52458 | 11/1998 |
| WO | 99/07273 | 2/1999 |
| WO | WO 00/08998 | 2/2000 |
| WO | 00/18998 | 4/2000 |
| WO | WO00/40793 * | 7/2000 |
| WO | WO 00/40793 | 7/2000 |

* cited by examiner

Fig.3A
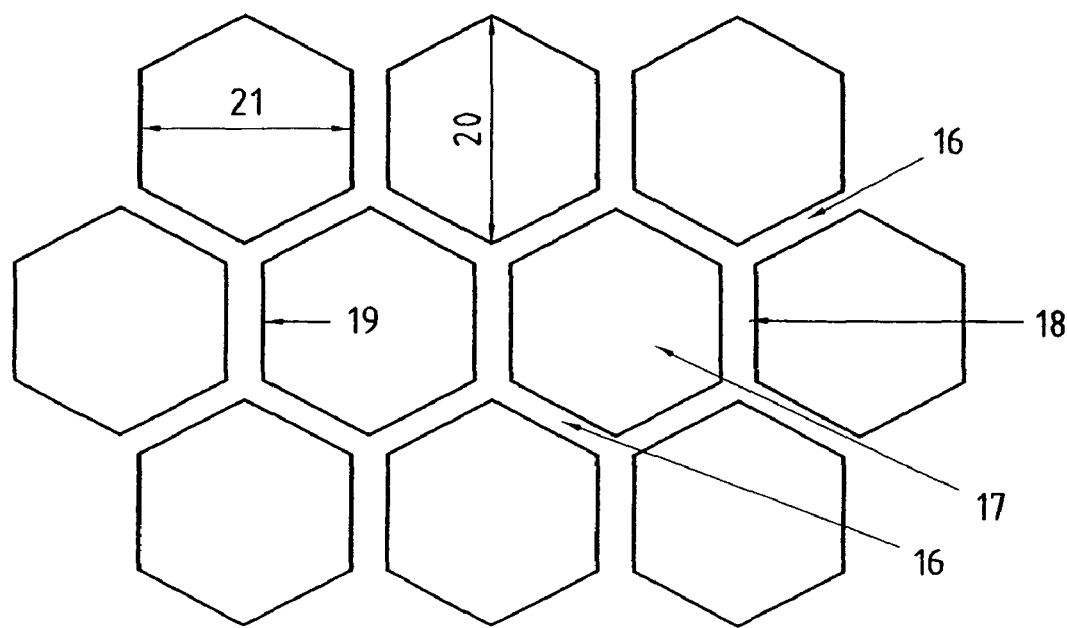
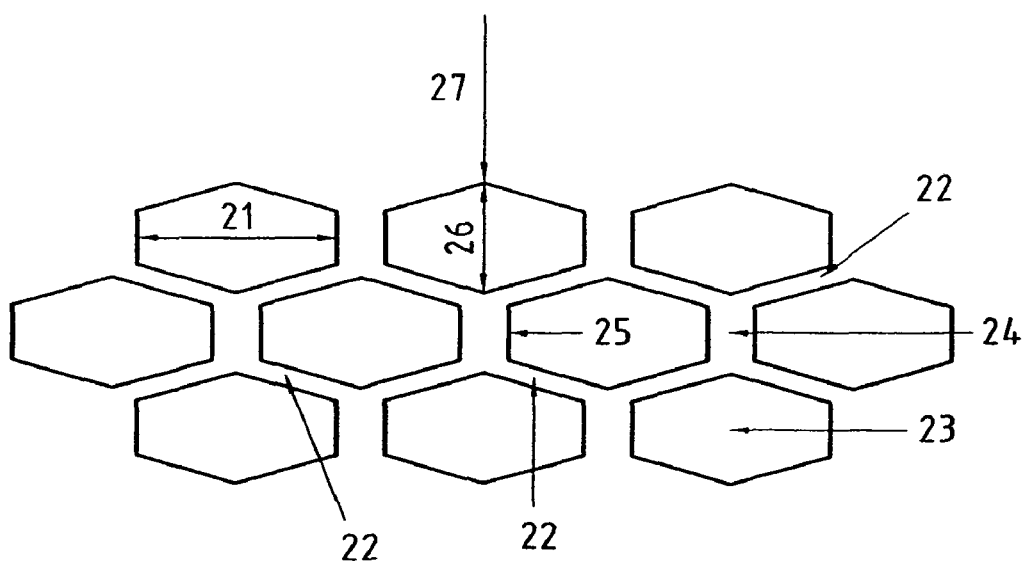
FIG. 3B

NONWOVEN FABRICS WITH HIGH FLUID ABSORPTION CAPACITY AND A REGULAR STRUCTURE, PROCESS FOR THEIR PRODUCTION, AND THEIR USE

FIELD OF THE INVENTION

The present invention relates to highly absorbent nonwoven fabrics with a regular surface pattern, as well as their production and use.

BACKGROUND INFORMATION

Many different kinds of wiping cloths are commercially available. Common types are made of paper or nonwoven fabrics, and are often used as damp wiping cloths or are supposed to absorb fluid. Such wiping cloths are used as wet wipes or as fluid-absorbent cloths, for example, in baby care, in the cosmetics sector, for example, for the treatment of acne, for removing dirt in the household, in the bathroom, or for cleaning buildings, for applying or removing or removing care substances or cosmetic substances to the skin, for applying or removing medical substances, or for personal hygiene. These are structures that usually are supposed to possess a high water absorption or fluid absorption capacity, for this purpose of use. In addition to water, these structures frequently contain many different kinds of lotions based on oils or oil/water mixtures, and/or chemical substances that support the cleaning effect, together with the fiber surface. Since the products are often used with the hands, the products are offered either in voluminous, bulky form, or are folded or bunched together during use, so that they can be handled more easily and comfortably during use.

Three-dimensional structures for use as a wiping cloth are described in International Published Patent Application Nos. WO 00/18998 and WO 99/07273. Composites of at least one or two nonwoven fabrics and extruded, biaxially stretched nets, for example, made of polypropylene, are conventional. After lamination, for example, by partial bonding caused by pressure and temperature, they develop raised areas in the third dimension due to shrinkage, and thereby become more voluminous. These raised areas are relatively irregular because of the shrinkage in both directions, i.e., in the lengthwise and crosswise orientation of the monofilaments, and they are not particularly appealing optically. Bonding of the two nonwoven fabrics occurred through the net, as the result of hot bonding in a calender under pressure and temperature, at certain points or in a pattern.

A nonwoven fabric that is made up of at least one unidirectionally stretched spunbond and a staple fiber nonwoven fabric bonded to it is described in European Published Patent Application No. 0 814 189. The laminate is characterized by a high volume and a good textile feel.

Three-dimensionally structured fiber fabrics are conventional. German Published Patent Application No. 199 00 424 describes three-dimensionally structured combinations of endless fiber layers and staple fiber layers that are thermally bonded together in the form of a regular pattern. The development of the three-dimensional structure occurs by using fiber layers with a different shrinkage capacity. By triggering the shrinkage, the staple fiber layer is given a three-dimensional structure. In this connection, however, it has been shown that the resulting three-dimensional structure is irregular, since the sequence of elevations and depressions occurs according to a random pattern.

Examples of such laminates are fiber fabrics of at least one or two nonwoven fabrics and extruded, biaxially stretched nets, for example made of polypropylene (referred to as "PP" hereinafter). These develop raised areas in the third dimension after lamination, due to shrinkage. These raised areas are relatively irregular, because of the shrinkage in both directions, i.e., the lengthwise and crosswise orientation of the monofilaments of the stretched PP net, among other things, and they are not particularly appealing optically. Bonding of the two nonwoven fabrics usually occurs through the net, as the result of hotmelting in a calender under pressure and temperature, at certain points or in a pattern.

It is an object of the present invention to provide three-dimensionally structured fiber structures that demonstrate a clearly increased fluid absorption capacity and, at the same time, are characterized by a regular three-dimensional pattern. In other words, fiber structures with a high fluid absorption capacity with a regular structure and a large volume, i.e., bulkiness, are supposed to be produced by the present invention, i.e., by taking specific measures according to the present invention, it is supposed to be possible to predetermine a high level of water absorption and, at the same time, the structure of the three-dimensional elevations and depressions is supposed to be predetermined, and the randomness and the irregularities in structure connected with it are supposed to be prevented.

SUMMARY

The present invention relates to a three-dimensionally structured, voluminous, and bulky fiber fabric, with a high fluid absorption capacity of at least 5 g fluid per g of fiber fabric, a thickness of at least 0.8 mm, e.g., at least 1 mm, e.g., 1 to 5 mm, and elevations and depressions that occur alternately and regularly with reference to the fabric plane, which includes at least one nonwoven fabric layer and a shrunk fabric bonded to it, where the bond between the nonwoven fabric layer and the shrunk fabric has been produced by hot bonding, where the hot bonding occurred at least perpendicular to the direction of the greatest shrinkage of the shrunk fabric, in the form of regularly arranged lines, e.g., in the form of regularly arranged and uninterrupted lines, and where spaces have formed between the nonwoven fabric layer and the shrunk fabric, at the alternately occurring elevations and depressions, which spaces promote the fluid absorption capacity of the fabric.

The laminate according to the present invention may demonstrate a high level of relative and absolute water absorption. The high absolute water absorption may be achieved in that fiber structures possess a higher mass per unit area after shrinkage into a three-dimensional structure, and thereby may absorb more water. Such three-dimensionally structured fabrics may also demonstrate a higher water absorption in percentage terms, which is independent of the mass per unit area used. Because of the process of shrinkage into the third dimension, a higher fluid absorption capacity in terms of percentage may be achieved, and, at the same time, a regular, three-dimensional, and voluminous pattern may be produced.

In water-absorbent structures, viscose fibers are normally used as the main or minority component, in order to achieve a high level of water absorption capacity. In accordance with the present invention, the relative water absorption of products that contain viscose may be increased. Materials that contain no viscose component at all may also demonstrate a very high relative and absolute water absorption capacity. Therefore there is the possibility of achieving three-dimensionally structured fabrics with a high adsorption or absorption capacity, without having to use viscose fibers. Viscose fibers may be higher in price than fibers based on polypropylene or polyester, and when subject to moisture, they may tend to promote the formation of odors. This may be prevented by using a nonwoven fabric structure without viscose and/or related polymers.

The nonwoven fabrics used in the laminates according to the present invention may contain fibers of thermoplastic polymers, such as polyolefins and/or polyesters, or semisynthetic fibers, such as viscose fibers and/or viscose-related fibers, such as Lyocell®, or fibers made from renewable resources, or blends of these fibers.

In another example embodiment, the laminates according to the present invention may contain fluids, e.g., water and/or oil/water emulsions.

The laminate according to the present invention has at least one layer of nonwoven fabric and at least one layer of another fabric that is structured so that it tends towards shrinkage, i.e., a reduction in its area, under the effect of moist and/or dry heat.

The nonwoven fabrics that are used according to the present invention, and do not shrink or shrink only slightly under the production conditions, may be made of any fiber types with entirely different titer ranges, for example titers from 0.5 to 50 dtex. In order to guarantee sufficient softness, fiber titers of less than 5 dtex, e.g., less than or equal to 3.5 dtex, e.g., less than or equal to 3.3 dtex, may be provided for the outside layers of the laminate according to the present invention. In addition to homofil fibers, heterofil fibers or blends of very different fiber types may also be used. In addition to spunbond nonwoven fabrics, staple fiber nonwoven fabrics may be used, and nonbonded nonwoven fabrics may be used.

In an example embodiment, the three-dimensionally structured fiber fabric according to the present invention may contain three layers, where the two layers of nonwoven fabric that cover the shrunk fabric three-dimensionally are made up of staple fibers, and where the covering nonwoven fabric layers may demonstrate the same or a different fiber orientation and/or the same or a different fiber structure.

Typically, the nonbonded precursor stages of the nonwoven fabric layers (fiber fleece) have masses per unit area of 5 to 100 g/m$^2$, e.g., 10 to 90 g/m$^2$.

The fiber fabric according to the present invention typically demonstrates a shrinkage bulkiness (as defined below) of at least 100%, e.g., 150 to 400%.

Three-layer fiber laminates with low total masses per unit area after hot bonding and before shrinkage, of 20 to 100 g/m$^2$ may be used. It is possible to produce laminates that are particularly light-weight and, at the same time, highly absorbent, from these fiber laminates.

In an example embodiment, the three-dimensionally structured fiber fabric according to the present invention contains three layers, and has masses per unit area of 40 to 300 g/m$^2$.

In this connection, the shrinkage may occur in only one preferential direction, but also in both or in more than two directions. The shrinkage amounts in the case of several directions, such as in both directions, i.e., the machine running direction and at a ninety degree angle to the machine running direction, may be the same or may be completely different.

To establish the bonding pattern for fixing the fiber fleece or nonwoven fabric layer, which is not or only slightly capable of shrinkage under the process conditions, in place on the fabric that may shrink, their ratio in the lengthwise to the crosswise direction should be approximately reproduced, e.g., in the same ratio. If, for example, the fabric that may shrink shrinks exclusively in the lengthwise direction, and therefore demonstrates no crosswise shrinkage at all, the line pattern for hot bonding the nonwoven fabric and the fabric that may shrink may be selected perpendicular to the crosswise direction. For example, as an engraved calender roller, one that has elevations that are aligned 100% in the crosswise direction may be selected, i.e., it may have continuous lines for hot bonding.

The hot bonding between the fiber fleece and/or the nonwoven fabric layer and the shrunk fabric, i.e., the fabric capable of shrinkage, in the laminate according to the present invention, may occur by heat and pressure in the calender nip and/or by ultrasound.

The distance between these lines and the linear shrinkage amount may be responsible for the structure of the elevations and the depressions. That is, the shape of the parts of the fiber fabric that project out of the plane may be precisely established by the progression of the lines of the hot bonding pattern.

The shrinking or shrunk fabric may be of any nature. In this connection, it may be a fiber fabric that may shrink, for example, a woven fabric, a knit fabric, a net, an interlaid scrim, monofilaments or staple fiber or multifilament yarns that extend parallel, or a nonwoven fabric, or it may be a film that may shrink. The fiber fabric that may shrink may be made up of stretched threads or yarns that are in a linear alignment and are oriented parallel to one another. The stretched or drawn threads or monofilaments may be made up by other threads/monofilaments or yarns that are stretched in a different direction, aligned at an angle to the first direction, or that are not stretched or are stretched less. The fibers, threads, or monofilaments that cross each other may be bonded to the others by an inherent bond, for example, by a mechanical bond or by hot bonding at the intersection points. However, the bonding may also occur using binders, such as aqueous dispersions.

The three-dimensionally structured fiber fabric, structured according to the present invention and bonded to form a laminate, may be made up of a shrunk fabric and at least one nonwoven fabric that is not shrunk or has shrunk less under the process conditions. However, the shrunk fabric may also be covered with a nonwoven fabric on both sides, either symmetrically or asymmetrically, i.e., the weights of the two nonwoven fabric layers may be different or the same. Both nonwoven fabric layers may have the same amounts of shrinkage or different ones, to the extent that they tend to shrink at all. However, at least one of the two nonwoven fabric layers may have shrunk less than the shrunk fabric positioned in the center.

The fabric of the laminate that may shrink, i.e., has shrunk, may be made up of a film that has been stretched in one or both axes. The film may have been produced according to conventional production methods, for example, the film-blowing method, i.e., it may have been stretched in tube form. However, it may also be formed by extrusion through a broad-slit die, and have been lengthened in the machine running direction by mechanical stretching, or have been stretched crosswise to the machine running direction by a stretching frame or by passing through an intermeshing pair of rollers with rills in the machine running direction.

The usual stretching ratio of the film is up to 5:1 in one or both stretching directions. The stretching ratio should be understood to mean the length ratio of the film after and before stretching.

The extrudate of the film may be provided with conventional fillers or structure-forming agents, for example, with inorganic particles such as chalk, talcum, kaolin, etc. In this manner, a microporous structure may be produced by stretching, in a conventional manner, with the advantage of, e.g., better breathability.

However, the film may also have been perforated before the stretching process, using conventional methods, so that the perforations expand to become larger perforations after stretching.

However, the film may also have been slit before stretching, so that after being stretched, e.g., by stretching at a 90° angle to the length expanse of the slits, the latter are expanded to become perforations.

The film may have been weakened in a pattern before stretching, so that the weakened spots are expanded to become perforations during stretching. The pattern-like weakening of the film may occur by passing through a calender roller, i.e., by heat and pressure, and/or by ultrasound treatment.

Independent of whether it is perforated, weakened in a pattern, or slit, the film may be made up of a single layer or be composed of several layers, i.e., at least two, by coextrusion. One of the two or both outer layers of the coextruded film may be made up of thermoplastics with a different melting point than the other and/or the center layer. The fibers of the nonwoven fabric layers that surround the shrink film may be bonded exclusively to the layer(s) of the coextruded film with the lower melting point, and not to the center layer.

When using a film as the shrunk fabric, i.e., the fabric that may shrink, of the laminate, a certain increase in strength of the laminate is achieved. At the same time, the film prevents migration of the lotions applied, from the top laminate layers to lower layers, if the nonwoven fabric laminate is offered for sale packed in a stack, e.g., as a wet wipe.

The shrunk fabric, i.e., the fabric that may shrink, of the laminate may be made up of a loose fiber fleece of 100% shrinking, i.e., highly stretched fibers, which has been formed according to conventional nonwoven fabric laying techniques. The fibers may have been laid isotropically or in a preferential direction, i.e., anisotropically. The fiber fleece may have been prebonded before lamination, with at least one nonshrinking fiber nonwoven fabric layer, using conventional methods, where the prebonding conditions are controlled so that the shrinkage capacity is not influenced, or only influenced insignificantly. The fleece that is made up of shrinking fibers may be made up of the same or different titers of the same fiber. The titer of these fibers generally is in the range of approximately 0.5 dtex to approximately 50 dtex, e.g., in the range between 0.8 and 20 dtex. The fibers that make up the nonwoven fabric or fleece that may shrink or has shrunk may be made up of many different kinds of fibers, for example, of homofil fibers, but also of 100% bicomponent fibers or a blend of bicomponent fibers and homofil fibers, with the restriction that the polymer of the bicomponent fibers that has the higher melting point is identical with that of the homofil fibers, such as, for example, the fiber blend PP homifil with PP/PE side-by-side or core/mantle bicomponent fiber (PE=polyethylene). In the latter case, the mantle component is made up of PE, and this functions as the binding substance for fixing one or two nonshrinking fiber fabrics onto one or two sides of the shrink fiber layer.

The shrunk fleece or nonwoven fabric layer, i.e., the one that may shrink, may have been perforated using conventional methods, or it may demonstrate a net-like structure.

Those methods of perforation or structure-formation that are based on the principle of pushing the fibers aside in a pattern may be provided. Such methods, which do not destroy the material, are described in European Published Patent Application Nos. 0 919 212 and 0 789 793.

The perforation methods described above for the film may also be used.

Uniaxially or biaxially stretched, extruded plastic nets may also be used as the shrinking or shrunk layer of a composite structure. The degree of stretching in both directions may be the same or different.

At least one preferential direction may be highly stretched. A high degree of stretching or drawing should be understood to be a stretching ratio of at least 3:1.

The thickness of the fibers is usually 150 to 2000 μm. Extruded plastic networks should be understood to mean fabrics with a grid structure that are formed in that first monofilament sheets, arranged in parallel, cross with second monofilament sheets, also arranged in parallel, at a certain constant angle, and are inherently bonded together at the intersection points. In the case of plastic nets, the two monofilament sheets are normally made up of the same polymer. However, the thickness and the degree of stretching of the two filament sheets may be different.

Also, interlaid scrims may be used as the shrunk fabric, i.e., the fabric that may shrink. They differ from plastic nets or grids in that the intersecting filament sheets are not bonded together at their intersections by inherent bonding, but by application of a binder, such as aqueous polymer dispersions, for example. In this case, the two monofilament sheets that are oriented in parallel may be made up of different polymers. As a rule, interlaid scrims may only be suitable for use in the present invention if at least one of the two filament sheets is present in stretched form. In the case of interlaid scrims, both stretched monofilament fibers and homofilaments may be used. The angle of the intersecting filament sheets may fundamentally be any desired angle. However, the angle of 90° may be provided for practical reasons. The filament sheets of the interlaid scrim or plastic net may be aligned parallel, in the machine running direction, and the second filament sheets are aligned crosswise, i.e., at a 90° angle to the machine running direction. The distance between the first filaments, aligned parallel in the machine running direction, is generally in the range between approximately 0.5 and approximately 20 mm, e.g., between 2 and 10 mm, and that of the second filament sheets, aligned in parallel, is between 3 and 200 mm. The first filament sheets usually contribute to the total area shrinkage at more than 50 to 100%, e.g., at 70 to 100%, and, e.g., at 100%. In the latter case, precisely formed undulations or corrugations are formed.

The second filament sheets usually contribute to the total area shrinkage at 0 to 50%, e.g., 0 to 30%, and, e.g., 0%.

In addition to the shrinking fabrics, i.e., fabrics that may shrink, that have already been described, woven fabrics and knit fabrics may also be used, with the proviso that at least one of the two preferential directions, i.e., in a woven fabric, the warp or the weft, is made up of shrinking or shrunk fibers.

The nonwoven fabric that is used for shrinkage may have been subjected to a lengthening process before being laminated to form a composite. The nonwoven fabric may be lengthened in the machine running direction, using mechanical forces, and, if it is made up of fully stretched fibers, accordingly shortened in the crosswise direction, i.e., it suffers a loss in width.

Such so-called neck-in-stretch processes result in a clear reorientation of the fibers in the nonwoven fabric, in the direction of the stretching that was performed. Such a reorientation may be brought about more easily in that bonds within the nonwoven fabric are broken or greatly loosened by a temperature increase, and the reorientation of the fibers is preserved by cooling to room temperature. Such reorientation of the fibers may be provided if previously, the nonwoven fabric was isotropic, or one with only a slight preferential alignment of the fibers, i.e., if the shrinkage is desired preferentially in only one direction, and a clear undulation in the nonwoven fabric may be provided.

To determine the water absorption of the laminates according to the present invention, the so-called water retention capacity is determined, based on DIN 53923, according to the basket measurement method. The measurement apparatus used for this purpose is described in detail in DIN 53923. For this purpose, a nonwoven fabric sample that has been punched out is weighed to $\frac{1}{100}$ g (dry weight), placed in the appropriate basket, and weighted with a 10*10 cm plate. The sample stays under stress for 30 seconds and without stress for 30 seconds. After the period of effect, the sample is taken out of the water with tweezers, to drip off, and hung up diagonally, using a metal clamp. After 120 seconds of dripping time, the sample is weighed to $\frac{1}{100}$ g (wet weight).

The absolute water absorption is calculated as follows:

absolute water absorption (g/m$^2$)=(wet weight−dry weight)*100 (g/m$^2$)

relative water absorption (%)=(absolute water absorption (g/m$^2$)/ mass per unit area (g/m$^2$)*100%

The bulkiness (B) of the material in the unshrunk state and in the shrunk state is determined as a measurement number for the volume/the bulkiness of the laminate according to the present invention, and thereby of the space gain that occurs after shrinkage to form alternately occurring elevations and depressions, and the shrink bulkiness (SB) is determined from the former. The thickness of the material is determined using a touch sensor with a dial gauge and a contact pressure of 8 g/cm$^2$.

bulkiness (B)=thickness of the material (mm)/mass per unit area (g/m$^2$)

shrinkage bulkiness (SB)=(bulkiness after shrinkage/ bulkiness before shrinkage)*100%

The present invention also relates to a process for the production of the water-absorbent, three-dimensionally structured fiber fabric defined above, which includes the following measures:

a) combining at least one fiber fleece and/or nonwoven fabric with a fabric that may shrink, b) hot bonding the fiber fleece and/or the nonwoven fabric to the fabric that may shrink, in the form of a line pattern, e.g., by heat and calender pressure and/or by ultrasound, where the line pattern extends at least perpendicular to the direction of the greatest shrinkage of the fabric that may shrink, c) heating the resulting laminate to such a temperature that shrinkage of the fabric that may shrink is triggered, and elevations and depressions that occur regularly and alternately with reference to the fabric plane are formed, and where the degree of shrinkage is selected so that spaces have formed at the alternately occurring elevations and depressions, which promote the fluid absorption capacity of the fabric, and thereby the density of the nonwoven fabric is reduced and the bulkiness is increased.

Hot bonding of the fiber fleece and/or the nonwoven fabric to the fabric that may shrink may be performed in any desired manner, for example, by calendering with an embossing calender, one roller of which has a regular line pattern, or by hot bonding using ultrasound or infrared radiation, which act on the nonwoven fabric in a predetermined pattern, in each instance.

The laminate according to the present invention is characterized by a great thickness with reference to its low mass per unit area, i.e., by a low density and a simultaneous high water absorption capacity. The alternately occurring elevations and depressions create space for the absorption of fluids with low to high viscosity, e.g., water or water/oil mixtures, of fluid multiphase systems, such as emulsions. These fluids fill the spaces between the alternately occurring elevations and depressions, completely or partially, and also cover the surface of the laminate according to the present invention with a layer.

The laminate according to the present invention may be particularly used in the sector of wet wipes, for example, in the sector of baby care, cosmetics, skin care, for removing dust or dirt in the household, or in industry, as a fluid dispenser for cleaning or for applying fluids, e.g., medical substances or cosmetics. These uses are also an object of the present invention.

BRIEF DESCRIPTION OF THE DRAWINGS

FIGS. 3a, 3b, 4a and 4b illustrate the surface of a calender roller.

DETAILED DESCRIPTION

Figure 1:
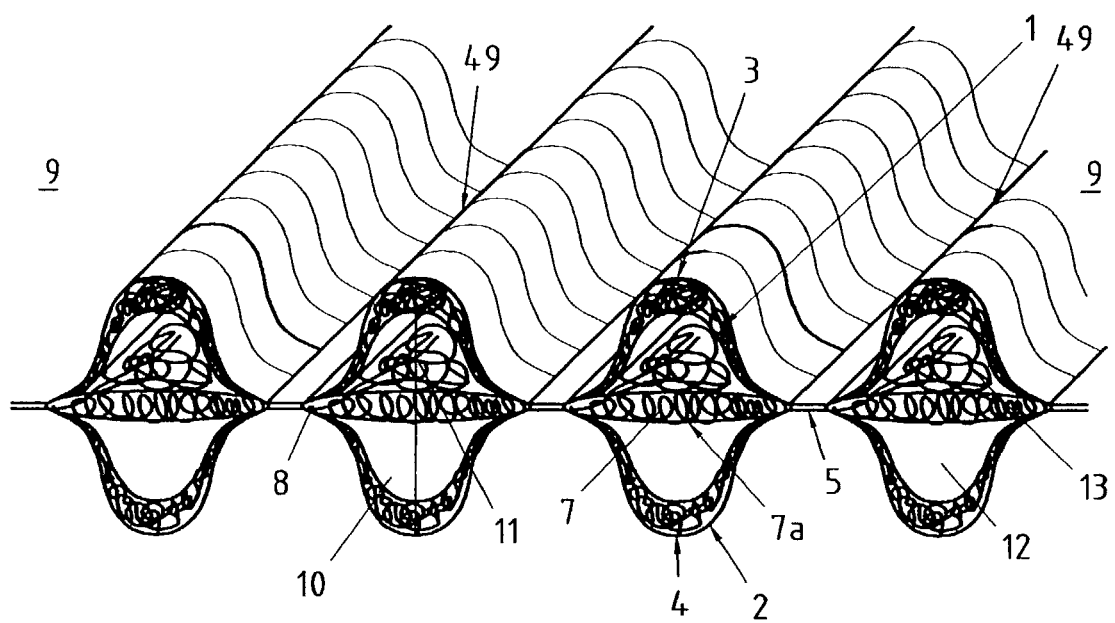
FIG. 1 illustrates a shape of the corrugations (hills/undulations).

One of the numerous variants of the fiber fabric according to the present invention is illustrated schematically in FIG. 1. In this case, the laminate is made up of a total of three nonwoven fabric layers.

(1) and (2) are each unshrunk fiber fleece or nonwoven fabric layers, which have been hot bonded onto the fiber fleece of a third nonwoven fabric (7) that is positioned in the center of the laminate, using pressure and temperature or using ultrasound bonding, in the form of uninterrupted lines, before the shrinkage treatment. The three fiber fleece or nonwoven fabric layers are intimately bonded to one another at ridge-like, i.e., line-shaped bonding sites (5) that are aligned parallel to one another.

In the laminate illustrated in FIG. 1, both the fiber mixtures and the masses per unit area of the two nonwoven fabrics (1) and (2) are identical, so that after shrinkage of nonwoven fabric (7), a double wave is formed, with a mirror image in cross-section, with the same wave height (10) and (11). Wave height should be understood to mean the maximum distance of the wave from the center of the laminate. In the area of peaks (3) and (4) of the mirror-image waves, the fibers of nonwoven fabric layers (1) and (2) have been compacted the least. The compaction increases more and more from peak (3) or (4) to bonding site (5), and achieves its absolute maximum there. Shrunk nonwoven fabric layer (7) is bonded most weakly at center (7a) between the ridge-like bonding sites (5), and bonded most strongly within bonding sites (5).

The fiber fleece or nonwoven fabric layers (1) and (2) may also have different structures and different masses per unit area. The shrinkage in the case of FIG. 1 occurred exclusively in the direction along line 9-9, where this direction is identical with the machine running direction (lengthwise direction). The wave-like raised areas of nonwoven fabric layers (1) and (2) result in cavities (12) and (13) that are arranged as mirror images.

Figure 2A:
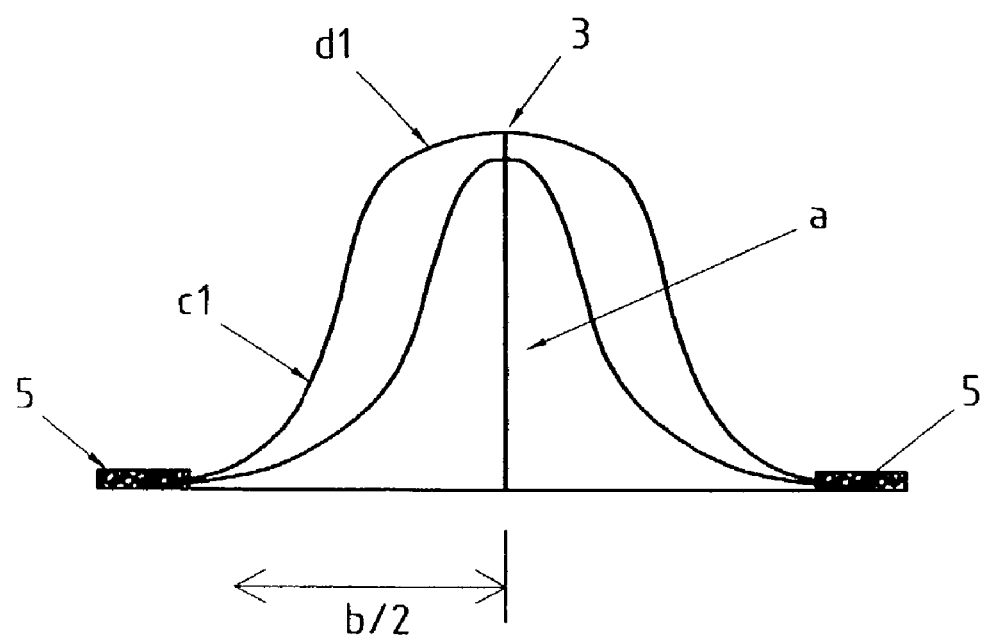
FIGS. 2a, 2b, 2c illustrate details from FIG. 1.
Figure 2B:
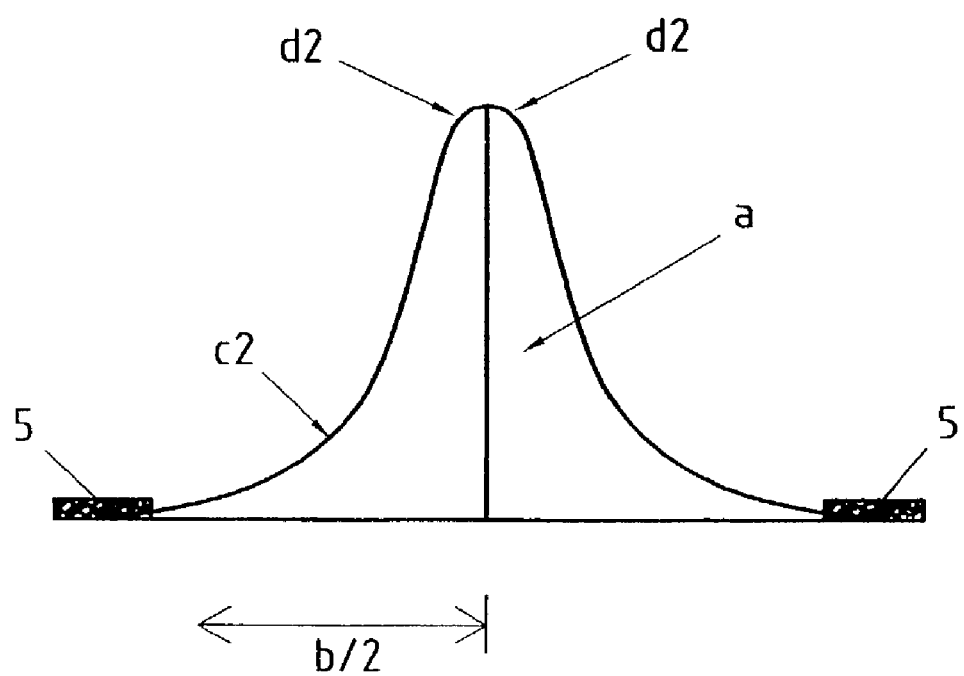
Figure 2C:
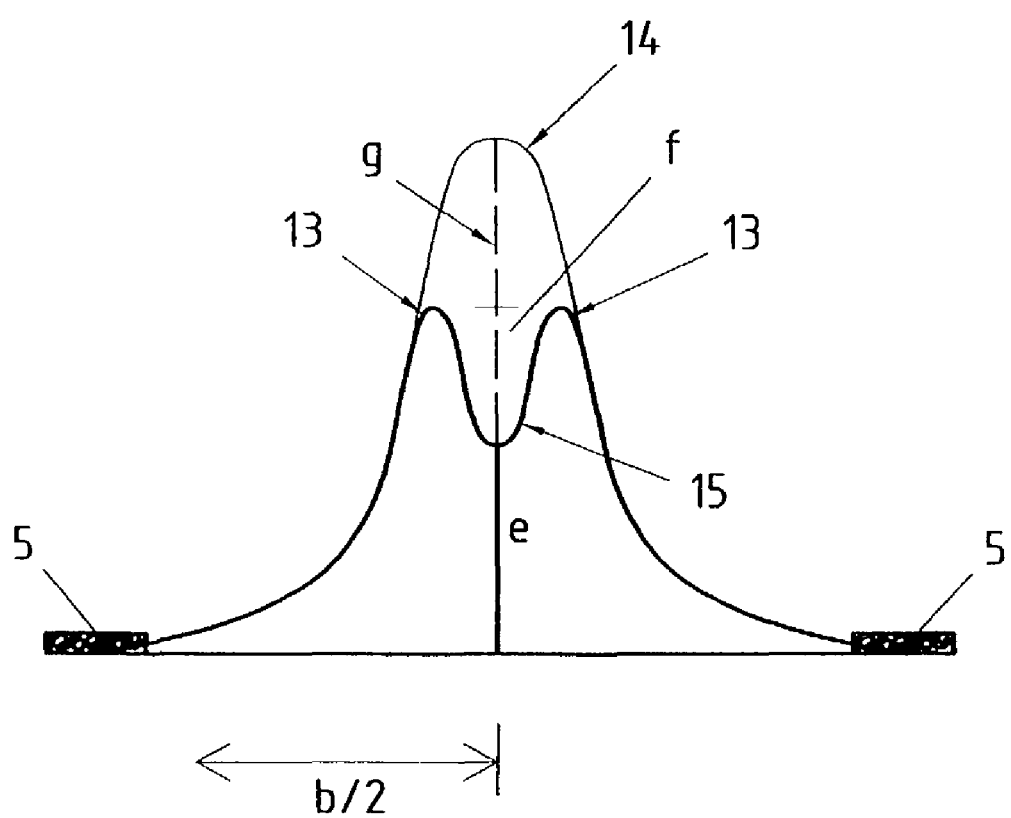

In FIGS. 2a, 2b, and 2c, the top half of the mirror-image undulation is illustrated in cross-section, i.e., along line 9-9. The undulation extends, as illustrated in FIG. 2a, from one bonding site (5) via peak (3) to a second bonding site (5). The turning point of undulation (c1) and the second turning point (d1) and thereby the "bulginess" of the undulation are greatly dependent on the drapeability, i.e., deformability of nonwoven fabric (1) and (2). FIG. 2a illustrates a nonwoven fabric with a greater stiffness (lesser drapeability) than the one illustrated in FIG. 2b. In the case of very light nonwoven fabric weights with very weak bonds within the nonwoven fabric layer, i.e., with bonds only at certain points, the case may occur that peak (14) of the undulation collapses because of insufficient stiffness, as is illustrated in FIG. 2c. This causes two new peaks (13) to form, which in an ideal case are arranged symmetrical to center axis g and have the same shape.

The ratio a/0.5b of height a of the undulation to half the distance b/2 between two adjacent bonding lines (5), and the drapeability of nonwoven fabric layers (1) and (2), essentially determine the shape of the undulation. Height a in relationship to b/2 is determined by the ratio of the distance between bonding regions (5) before and after shrinkage. The greater this ratio of (b before) and (b after), the greater the ratio a/0.5(b after). The proportion of the area in the laminate that is covered by undulations, i.e., hills, in relation to the total area after shrinkage, also depends on the proportion of area of the areas not bonded to (7) before shrinkage, i.e., after bonding to form a laminate, and the degree of area reduction caused by shrinkage. The number of undulations, i.e., hills per $m^2$, is also determined by the amount of area shrinkage. The size of the undulations, i.e., the distance b after shrinkage, i.e., the hills, is also determined by the size of the areas not bonded by bonding regions (5) and the ratio of the areas before and after shrinkage.

The shape of the elevations, i.e., raised areas on the shrunk laminate, i.e., their deformation after shrinkage, depends on the shape of the areas not bonded to center layer (7) at hot bonding or bonding sites (5), the total area shrinkage, and the ratio of the shrinkage in the machine running direction and perpendicular to the machine running direction. In the case of monofilaments or multifilaments that are bound into the laminate and highly stretched parallel to the machine running direction (or generally in a preferential direction), so-called linear shrinkage occurs, which should be understand to mean the shrinkage exclusively in this preferential direction.

In the various forms of the present invention, the fibers or portions of the fiber blends of the nonshrinking nonwoven fabric outside layers of the three-layer composite may be coordinated, more or less, with the shrinking center layer. The softness or rigidity of these 3D (three-dimensionally) structured outside layers may be modified within wide limits by the selection of the fibers used. The structure of these 3D nonwoven fabric layers depends on the required properties, i.e., on the applications that require them, to a great extent.

For the structure of the two outside layers of the laminate that are deformed to form 3D structures, and for their structural integrity, it is of great significance whether the center layer that triggers the shrinkage has a porous or a dense, i.e., nonpermeable structure, i.e., whether it is made up of fibers, nets, interlaid scrims, nonpermeable films, etc.

When using films, the delamination strength between the 3D nonwoven fabric layers and the film is determined exclusively by the quality of the bond between fibers and film at the interface to the film. The film acts as a separating layer for the upper and lower 3D nonwoven fabric layer. To achieve sufficient delamination forces/lamination forces between the film and the 3D nonwoven fabric layer, the film and the fibers (at least a proportion of a fiber blend) may be adhesion-compatible with each other. This is achieved, in a conventional manner, in that the film and the fibers, i.e., one fiber component of bicomponent fibers, i.e., fiber components of a fiber blend, are made up of chemically similar polymers, or polymers with the same structure. If, for example, a PP film (PPO film) that has been biaxially stretched using the blowing method is used as the shrink-triggering film, for the purpose of good adhesion, at least a high percentage (at least 20-30 wt.-%) of the nonwoven fabric layer that is deformed to produce the 3D structure may also be made up of polyolefin or polyolefin copolymer homofil fibers, i.e., when using bicomponent fibers, if the binding component with the lower melting point is made up of polyolefin.

Examples of such fibers that adhere well to PP film are fibers made of PP, PP copolymer, PE or PE copolymer, i.e., bicomponent fibers the core of which is made up of polyester and the mantle of which is made up of PP, PE, or copolymers of them. The fiber polymer that functions as the adhesive component may also have been crosslinked with a tackyfier=tackiness agent or plasticizer. In order to achieve a destruction-free or non-damaging effect during hot bonding, using ultrasound or heat and pressure, of the fiber fleece(s) onto the film, the melting point or thermoplastic plastification point of the fiber component with a lower melting point may not be greater than that of the stretched film, or may be at least 5 to 10° C. below that of the film.

Another possibility of protecting the film, i.e., the core of the film, against mechanical destruction or weakening, is to use a stretched film that has been produced by so-called bilateral or monolateral extrusion. This should be understood to mean a two-layer to three-layer film the core of which is made up of a thermally more resistant polymer than the polymer that forms the one or both outside layers. As examples of this, a three-layer, stretched film with PPO as the core and two outside layers (generally lighter in weight) of polyethylene, polyolefin copolymers, or EVA (copolymer of ethylene and vinyl acetate) may be provided.

If networks or interlaid scrims stretched according to the present invention are used as the shrink-triggering layer, coordinating the polymer composition of the fibers of the nonwoven fabric deformed to produce the 3D structure with the shrinking center layer, for the purpose of nonwoven fabric/net adhesion, plays a much lesser role, or no role at all. The area coverage of the oriented monofilaments in the lengthwise and crosswise direction in an interlaid scrim/net is small enough to be ignored in relationship to the entire area. Bonding of the two nonwoven fabric layers above and below the interlaid scrim/net essentially occurs through the open areas not covered by filaments. Adhesion of the fibers to the monofilaments of the interlaid scrim/net is almost insignificant. For sufficient laminate adhesion, the upper 3D nonwoven fabric layer may be made up of bonding fibers that are the same or chemically similar, i.e., compatible, as the fibers that form the interlaid scrim/net, where their proportion in the two nonwoven fabric layers may be the same or different.

The stretched net, like the film, may be coextruded, where the use of a coextruded net does not make any significant contribution to the laminate adhesion, for the reasons indicated above.

The production of the two-layer or three-layer laminate and its shrinkage to form laminates with a 3D structure may be performed in separate steps. The bonding fibers that result in the laminate adhesion for improving structural integrity may be selected so that their plastification range, i.e., hot-melt adhesion range, is approximately at least 10° C., e.g., at least 15° C. below that of the shrinkage-triggering layer. The production of 3D structures according to the present invention, by shrinkage, may be provided for process control, uniformity of the area shrinkage, and the formation of the quality of 3D structures by two separate steps. While it is fundamentally possible to combine the two process steps in the calender nip in the case of lamination using heat and pressure, or by looping it around a heated calender roller, for the purpose of increasing the dwell time of the goods, this may not be provided, because it may be connected with a drastic reduction in the production speed.

FIG. 3a illustrates the surface of a calender roller with depressions in the form of an equilateral hexagon, in a top view. The equilateral hexagon is fundamentally already defined by its area (17) and edge length (19). FIG. 3a furthermore also illustrates length (20) from the top tip to the bottom tip, i.e., in machine running direction (27), and the width of the hexagon, crosswise to the machine running direction, to further define the hexagon. The two shortest distances (16) and (18) between the equilateral hexagons are identical and reproduce the frame of the hexagon and thereby the uninterrupted bonding lines, i.e., the bonding pattern with a honeycomb structure, in the nonshrunk laminate that has been bonded together using heat and pressure or ultrasound.

FIG. 3b illustrates the case of a laminate shrunk exclusively in machine running direction (27), with a linear shrinkage of 50%. Such a shrinkage occurs, for example, if an extruded net that was stretched only in the machine running direction is used as the shrinking fabric.

Because of this 50% shrinkage in only one preferential direction (for example, the machine running direction), distance (20) is reduced by half, to distance (26), in the laminate, and edge length (19) is also reduced by half, to edge length (26), while distance (21) remains unchanged before and after shrinkage. Area (17) of the equilateral hexagon is reduced to area (23), and the equilateral hexagon before shrinkage becomes a non-equilateral hexagon that has been compressed by 50% in the machine running direction. As a result, the equal distances (16) and (18) after shrinkage now become the unequal distances (22) and (24), where (24)>(22).

Figure 4A:
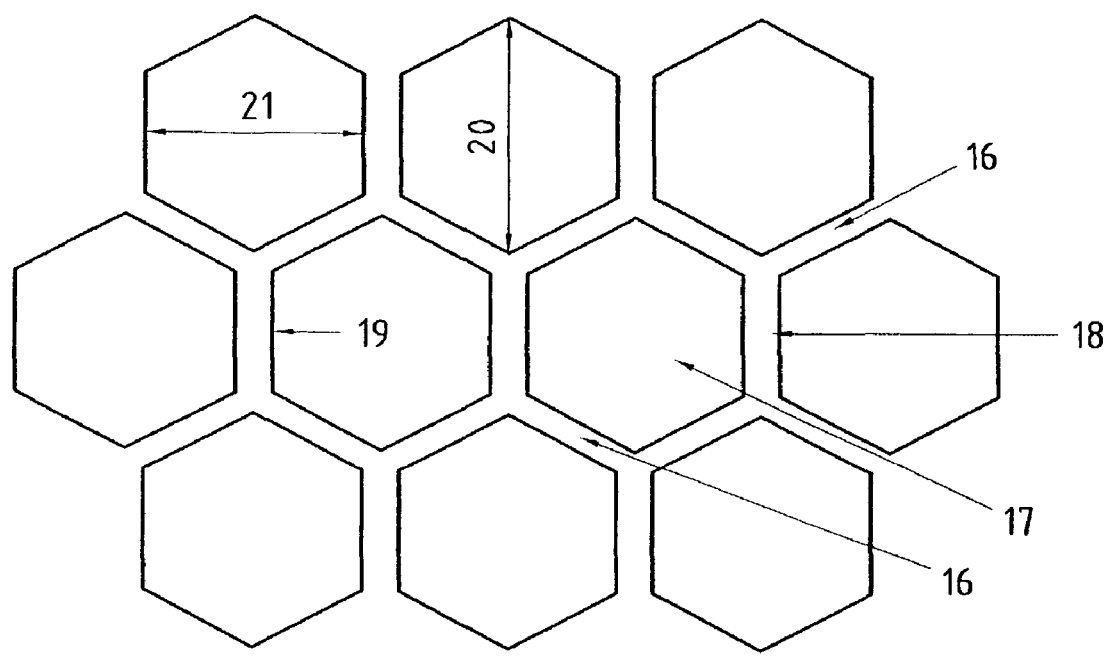

FIG. 4a illustrates the same surface of a calender roller as illustrated in FIG. 3a.

Figure 4B:
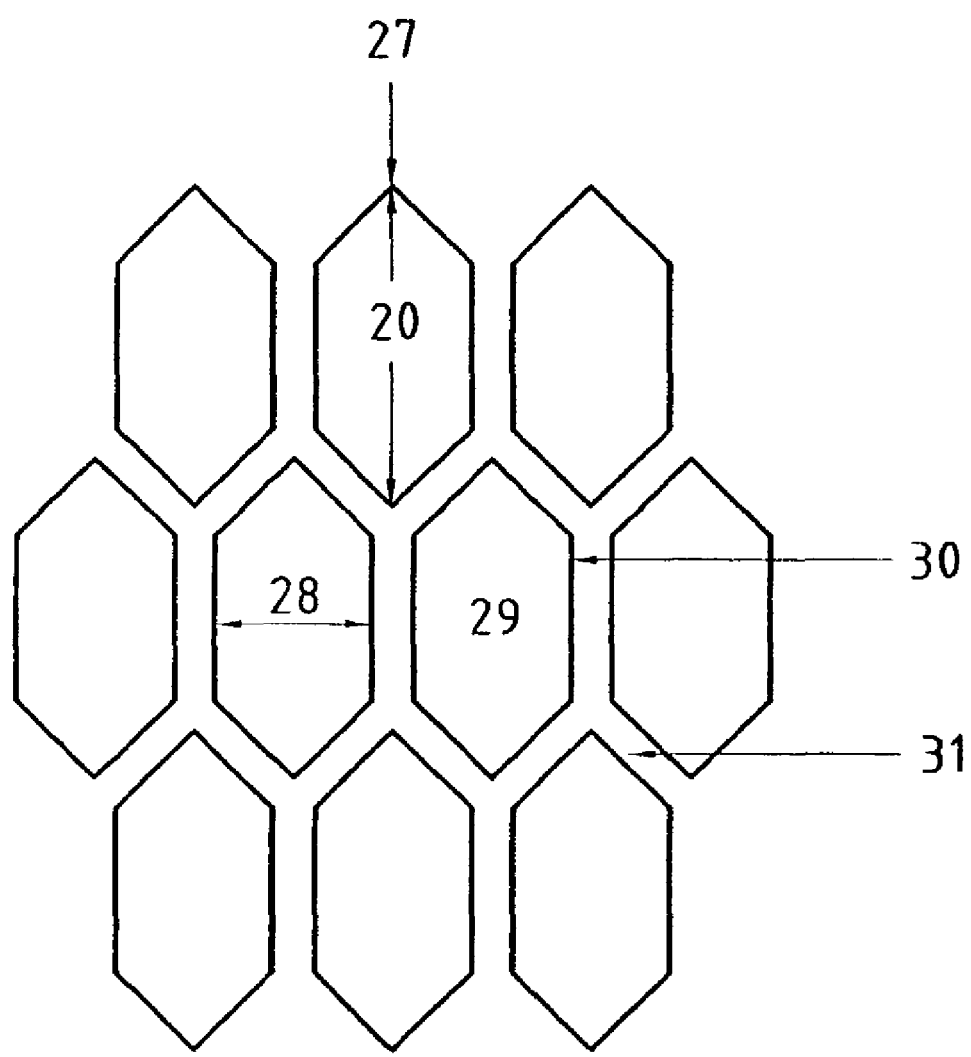

FIG. 4b illustrates the case of a laminate that is shrunk exclusively perpendicular to machine running direction (27), at a linear shrinkage of 50%. Such a shrinkage occurs, for example, if an extruded net that was stretched only perpendicular to the machine running direction is used as the shrinking fabric.

Because of this 50% shrinkage in only one preferential direction, distance (21) is reduced by half, to distance (28), while distance (20) remains unchanged before and after shrinkage. Area (17) of the equilateral hexagon is reduced to area (29), and the equilateral hexagon before shrinkage becomes a non-equilateral hexagon that has been compressed by 50% perpendicular to the machine running direction. As a result, the equal distances (16) and (18) after shrinkage now become the unequal distances (30) and (31), where (31)>(30).

Figure 5A:
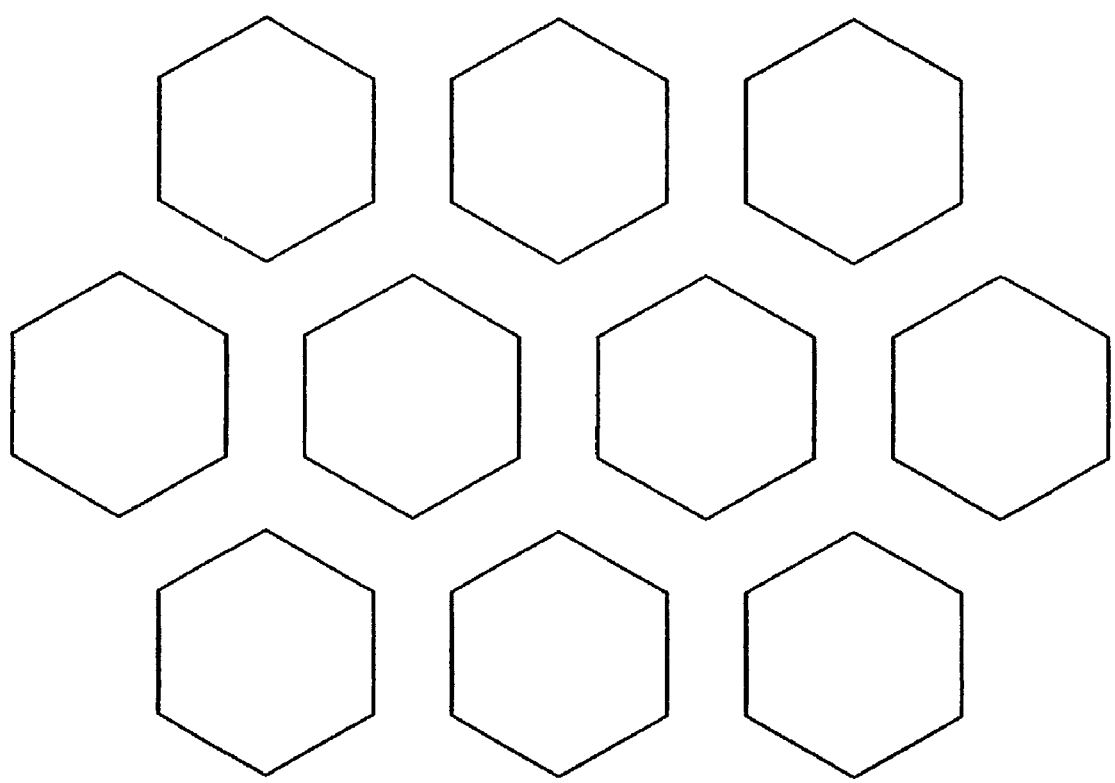
FIGS. 5a, 5b illustrate the case of shrinkage of 50% each in the machine running direction and crosswise to the machine running direction.
Figure 5B:
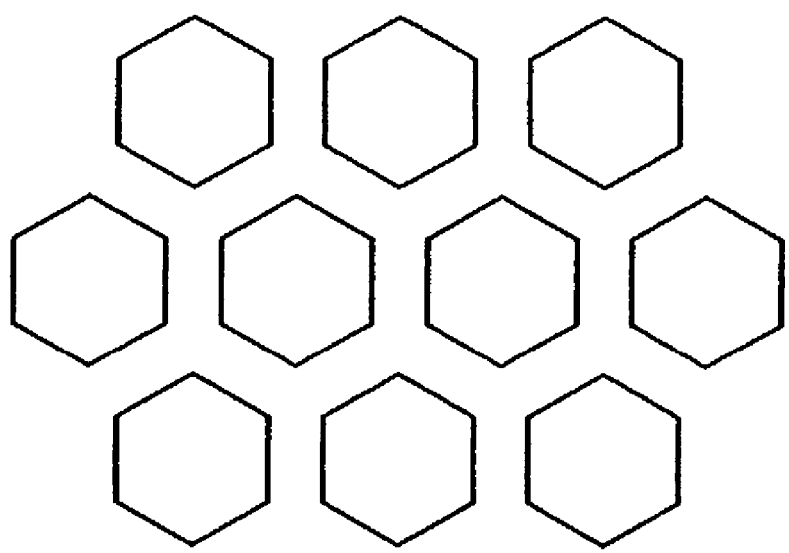

FIGS. 5a and 5b illustrate the case of a laminate shrunk by 50% each in the machine running direction and perpendicular to the machine running direction. The total shrinkage is 75%. In this case, the equilateral hexagons shrink accordingly, and remain equilateral. The shortest distances between the shanks decrease by 50%.

Figure 6A:
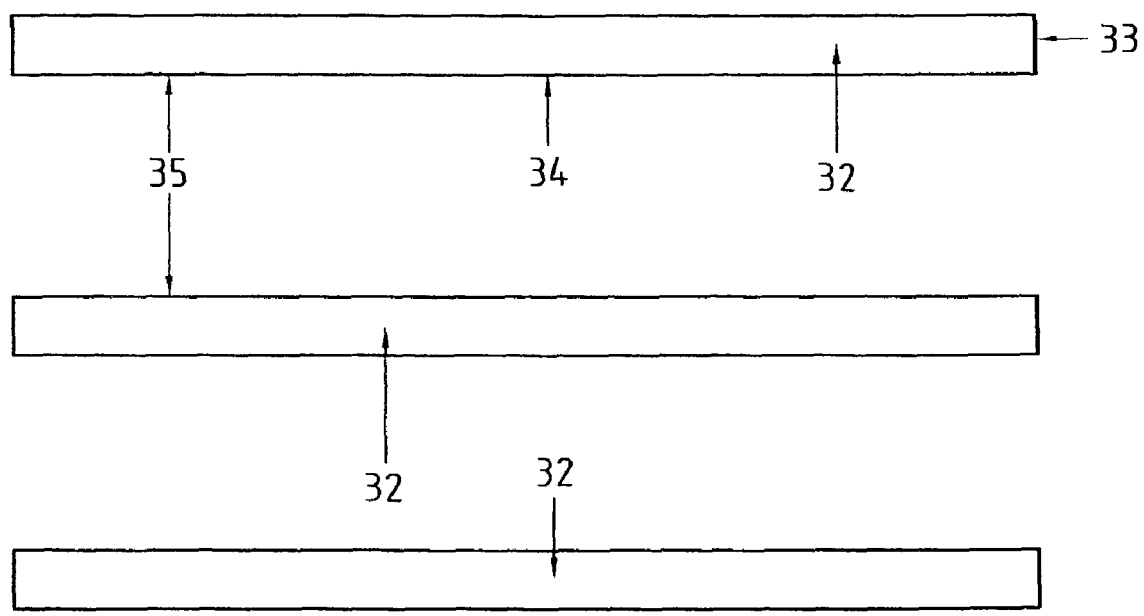
FIGS. 6a and 6b illustrate a laminate according to the present invention, with linear shrinkage perpendicular to the machine running direction.

FIG. 6a illustrates an enlarged top view of a laminate before the shrinkage treatment. The laminate is bonded over the entire width (34) of the goods with lines or bars with a thickness (32), a bar length (32) and a bar spacing (35), using heat and pressure or using ultrasound. This embossing bonding is referred to as a linear seal (LS) within the scope of the present specification.

Figure 6B:
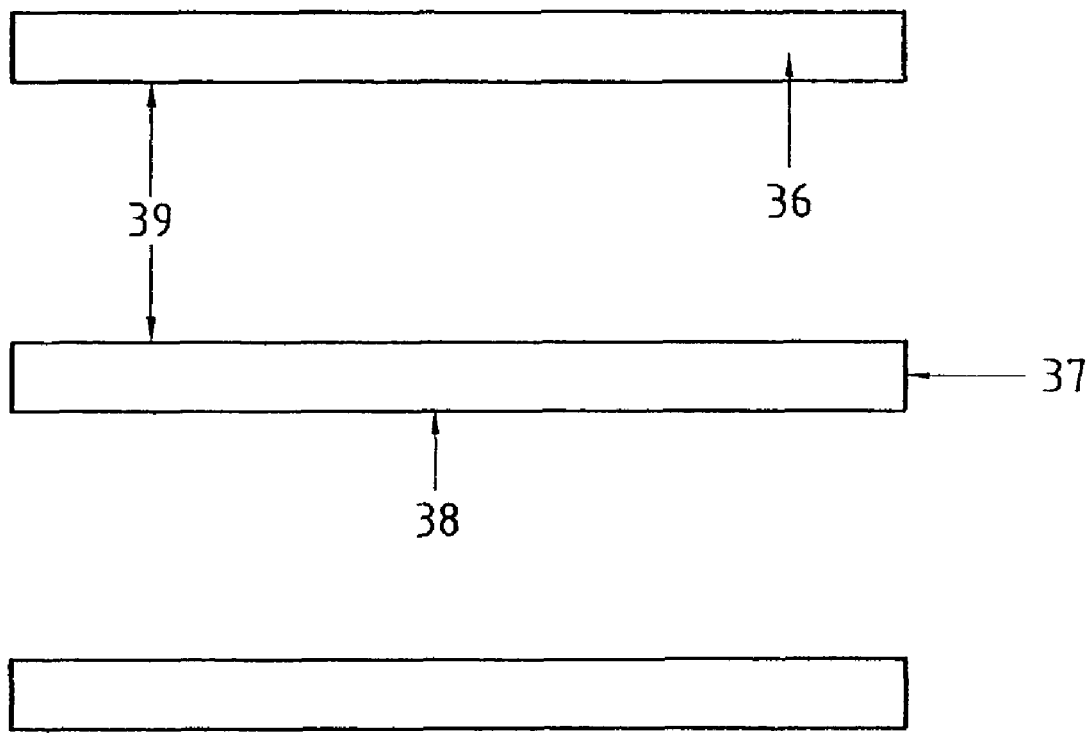

The status illustrated in FIG. 6b occurs after a shrinkage of approximately 25% that has occurred exclusively perpendicular to the machine running direction ("MLR"). Width (34) of the goods illustrated in FIG. 6a is therefore reduced by 25% to width (38) of the goods illustrated in FIG. 6b. Because no shrinkage occurs in the MLR, the thickness of the bars remains unchanged, i.e., (33) corresponds to (37), and the distance between them also remains constant, i.e., (35) corresponds to (39).

Figure 7A:
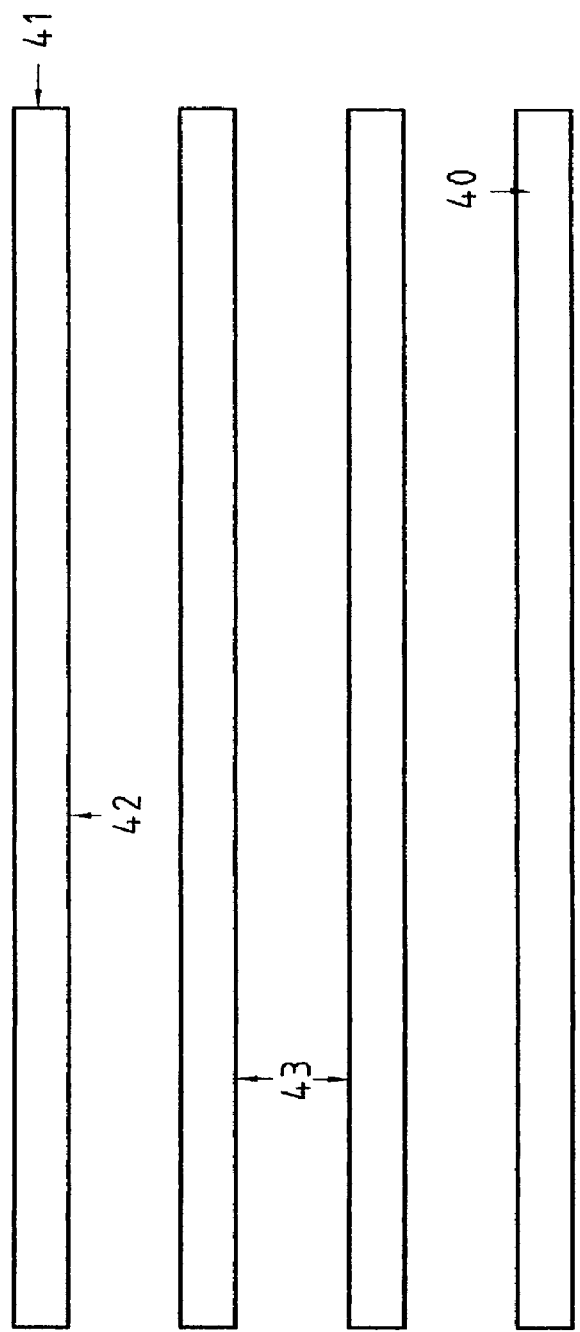
FIGS. 7a and 7b illustrate a laminate according to the present invention, with linear shrinkage in the machine running direction.
Figure 7B:
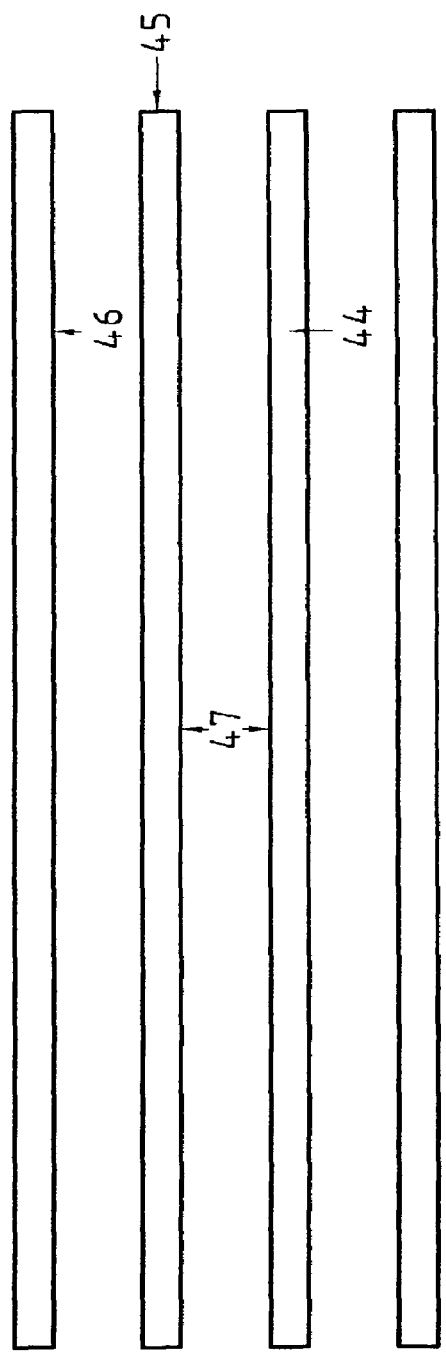

FIGS. 7a and 7b also illustrate an enlarged top view of an LS bonded laminate before and after shrinkage. In this case, a shrinkage of 23% has occurred exclusively in MLR (48). The width of the goods therefore remains unchanged (assuming that no distortions occur), and therefore also the length of the bars remains the same, i.e., (42) corresponds to (46). Area (40) of the bars before shrinkage is reduced by 23% to area (44), as is distance (43) of the beams before shrinkage by 23% to distance (47) after shrinkage, and accordingly, bar width (41) before shrinkage is reduced to bar widths (45) after shrinkage.

The three-layer laminate with exclusively linear shrinkage in the MLR, illustrated in a top view in FIG. 7b, results in a perspective view as illustrated in FIG. 1, with clearly formed undulations, where height (11) of the undulations at their peak (3) along line (49) is constant over the entire width of the goods.

Figure 8A:
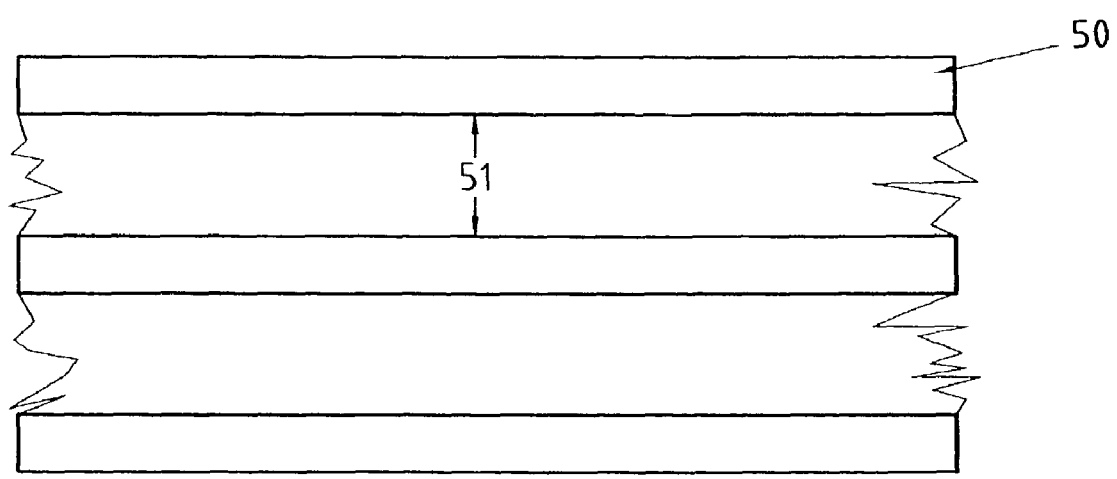
FIGS. 8a and 8b illustrate a laminate according to the present invention, with linear shrinkage perpendicular to and in the machine running direction.
Figure 8B:
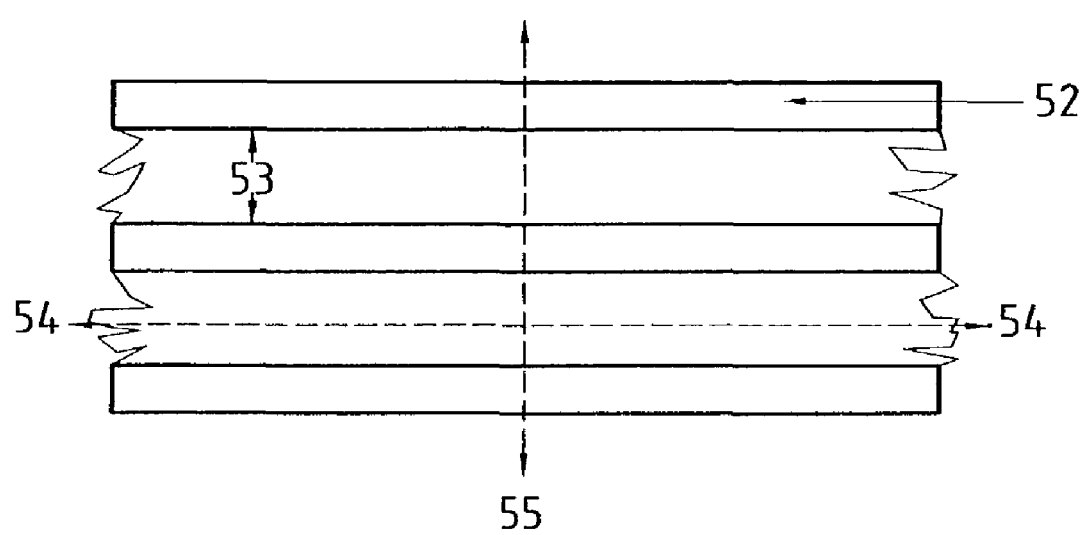

The case of shrinkage in a three-layer laminate, such as, for example, a laminate of nonwoven fabric/shrink film/nonwoven fabric, is illustrated in FIGS. 8a and 8b, i.e., both the bar bonding area (52) and the bar distance (53) are reduced in size in accordance with the shrinkage, perpendicular to the MLR and in the MLR, after shrinkage, to (54) and (55), respectively.

Figure 9:
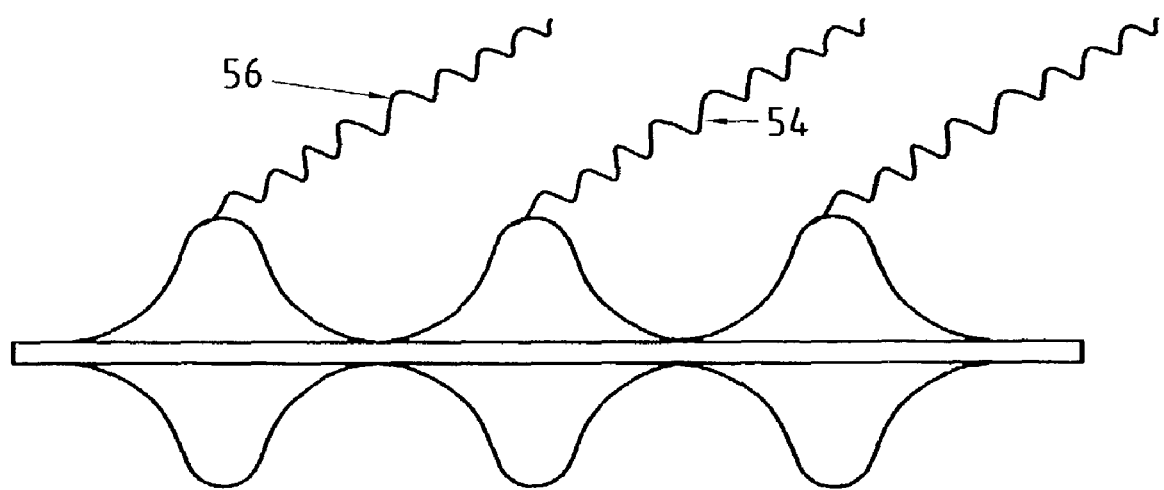
FIG. 9 is a perspective view of the laminate illustrated in FIG. 8b.

FIG. 9 is a perspective view of the laminate illustrated in FIG. 8b, where the cross-section of the perspective view is illustrated along line 55, and the status is illustrated along line 54.

In this connection, it may be seen that the height of the undulations along line 54 is not always the same over the entire width of the goods, but rather also includes a microundulation (56), caused by the crosswise shrinkage itself.

The following examples will explain the present invention, without limiting it.

EXAMPLE 1

To lay a fleece, a stripper with a cross lapper (indicated as K1), a stripper above a fiber laying belt (indicated as K2), with laying of the staple fibers in the machine running direction, and another stripper with a cross lapper (indicated as K3) were used. In this manner, it was possible to implement the desired three-layer composite structure of the nonwoven fabric. The fiber fleece layers laid with K1, K2, and K3 are referred to as F1, F2, and F3, respectively.

The fiber composition, the fiber orientation, and the fiber fleece weights of F1 and F3 were identical. Details concerning the structure of the mass per unit area and the fiber types are provided in Table 1 (Examples 1a, 1b). The three-layer composite, made up of the three fleeces F1, F2, and F3, was compacted slightly, by passing it through two steel pressing rollers that had been heated to a temperature of 80° C., before it was passed to the calender roller pair.

The calender roller pair was made up of a smooth steel roller and an engraved steel roller. The engraved steel roller had straight lines or strips, with a ridge width of 1 mm, oriented parallel to one another perpendicular to the machine running direction. The hot bonding area was 25%. The elevations of the strips were cone-shaped. The engraving depth was 0.9 mm. The distance between the parallel strips, measured center to center in each instance, was 4.0 mm.

Both rollers were heated to a temperature of 130° C. The line contact pressure was 65 N/mm. Because of the symmetrical structure of the three-layer composite, i.e., because of the fact that F1 and F3 were identical, it did not make any difference which of the two had contact with the engraved roller while passing through the calender.

The material bonded in this manner, using heat and pressure, was treated thermally. After shrinkage of the center fiber layer F2 of the three-layer nonwoven fabric composite in an oven at 160° C. for 90 seconds, the undulations illustrated in FIG. 1, oriented on both sides into the third dimension, were formed. Despite the completely symmetrical structure of the composite of F1, F2, and F3, the peaks of the undulations were slightly higher on the side of the engraving roller than those that had faced the smooth steel roller during calendering. These differences in the peak height on both sides of the shrunk fiber layer F2 proved to be lower when the engraving depth was higher.

Table 1 indicates the measurement results of the tests conducted using Example 1, as well as the shrinkage lengthwise and crosswise to the goods and in a flat plane. The mass per unit area was measured, as were the absolute and relative water absorption, using the basket test, based on DIN 53923, before and after the shrinkage process, in each instance, as were the shrinkage bulkiness (SB) and the thickness of the material.

TABLE 1

|  | Example 1a | Example 1b |
|---|---|---|
| Fiber fleece F1 | 65% viscose, dtex 1.4, cut length 40 mm, 35% polypropylene/copolypropylene homocomponent fiber, dtex 2.2, cut length 51 mm | 80% viscose, dtex 1.4, cut length 40 mm, 20% polypropylene/polyethylene bicomponent 4.8 fiber, dtex 1.7, cut length 51 mm |
| Fiber fleece F2 | 100% polypropylene fiber, dtex 6.7, cut length 90 mm | 100% polypropylene fiber, dtex 6.7, cut length 90 mm |
| Fiber fleece F3 | 65% viscose, dtex 1.4, cut length 40 mm, 35% polypropylene/copolypropylene homocomponent fiber, dtex 2.2, cut length 51 mm | 80% viscose, dtex 1.4, cut length 40 mm, 20% polypropylene/polyethylene bicomponent fiber, dtex 1.7, cut length 51 mm |
| Weight before shrinkage | 38 g/m² | 55 g/m² |
| Weight after shrinkage | 90 g/m² | 124 g/m² |
| Absolute water absorption before shrinkage | 340 g/m² | 810 g/m² |
| Absolute water absorption after shrinkage | 980 g/m² | 1254 g/m² |
| Relative water absorption before shrinkage | 895% | 810% |
| Relative water absorption after shrinkage | 1090% | 1254% |
| Shrinkage bulkiness (SB) | 208% | 175% |
| Thickness after shrinkage (mm) | 2.2 | 1.5 |

EXAMPLE 2

For the production of the composite described in Example 2, two strippers that laid the fiber layer F1 in the machine running direction (md) and a second stripper that laid the fiber fleece F3 were required. Both fiber fleeces had the same structure, in the example. A PP net that had been fully stretched exclusively in the md, with a mesh width of 3.3*8.5 mm and a mass per unit area of approximately 30 g/m², was introduced between the two fleeces. The three layers, i.e., layers S1, S2, and S3, were passed to the calender nip, which was made up of the rollers described above with regard to Example 1, after warm prepressing for the purpose of compacting. Calendering occurred at a line pressure of 65 N/mm. Subsequently, the sample was left in a drying cabinet at a temperature of 150° C. for 30 seconds, without distortion. Table 2 indicates the measurement results of the tests conducted using Example 2. The mass per unit area was measured, as were the absolute and relative water absorption, using the basket test, based on DIN 53923, before and after the shrinkage process, in each instance, as were the shrinkage bulkiness (SB) and the thickness of the material.

EXAMPLE 3

Example 3 differed from Example 2 only in that a monoaxially stretched film was placed between the two fiber fleeces F1 and F2. Table 2 indicates the measurement results of the tests conducted using Example 3. The mass per unit area was measured, as were the absolute and relative water absorption, using the basket test, based on DIN 53923, before and after the shrinkage process, in each instance, as were the shrinkage bulkiness (SB) and the thickness of the material.

TABLE 2

|  | Example 2 | Example 3 |
|---|---|---|
| Fiber fleece F1 = S1 | 80% viscose, dtex 1.4, cut length 40 mm, 20% polypropylene/polyethylene bicomponent fiber, dtex 1.7, cut length 51 mm | 80% viscose, dtex 1.4, cut length 40 mm, 20% polypropylene/polyethylene bicomponent fiber, dtex 1.7, cut length 51 mm |
| Intermediate layer = S2 | PP grid interlaid scrim, monoaxially stretched | 15 μm PPO film, monoaxially stretched |
| Fiber fleece F3 = S3 | 80% viscose, dtex | 80% viscose, dtex |

TABLE 2-continued

|  | Example 2 | Example 3 |
|---|---|---|
|  | 1.4, cut length 40 mm, 20% polypropylene/polyethylene bicomponent fiber, dtex 1.7, cut length 51 mm | 1.4, cut length 40 mm, 20% polypropylene/polyethylene bicomponent fiber, dtex 1.7, cut length 51 mm |
| Weight before shrinkage | 45 g/m² | 55 g/m² |
| Weight after shrinkage | 94 g/m² | 124 g/m² |
| Absolute water absorption before shrinkage | 272 g/m² | 810 g/m² |
| Absolute water absorption after shrinkage | 1034 g/m² | 1254 g/m² |
| Relative water absorption before shrinkage | 605% | 810% |
| Relative water absorption after shrinkage | 1100% | 1254% |
| Shrinkage bulkiness (SB) | 185% | 362% |
| Thickness after shrinkage (mm) | 1.7 | 2.0 |

What is claimed is:

1. A three-dimensionally structured fiber fabric comprising:
at least two nonwoven fabric layers; and
a shrunk fabric bonded to the nonwoven fabric layers, a bond between each of the nonwoven fabric layers and the shrunk fabric produced by hot bonding at least perpendicular to a direction of greatest shrinkage of the shrunk fabric in the form of regularly arranged lines, cavities formed between the nonwoven fabric layers and the shrunk fabric layer at alternately and regularly occurring elevations with reference to a fabric plane, the three-dimensionally structured fiber fabric having a high fluid absorption capacity of at least 5 g fluid per g of fiber fabric and a thickness of at least 0.8 mm, at least a first of the two nonwoven fabric layers attached to a side of the shrunk fabric layer and a second of the two nonwoven fabric layers attached to a second side of the shrunk fabric layer, wherein each of the at least two nonwoven fabric layers has an undulation spanning between bonds bonding the shrunk fabric and the at least two nonwoven fabric layers, a profile of said undulation defined by two peaks, wherein facing surfaces of the at least two nonwoven fabric layers approach the shrunk fabric in between the two peaks.

2. The three-dimensionally structured fiber fabric according to claim 1, wherein a bonding pattern fixing the nonwoven fabric layer in place on the shrunk fabric is in the form of regularly arranged and uninterrupted lines.

3. The three-dimensionally structure fiber fabric according to claim 1, wherein the hot bonding includes one of heat and calendar pressure and ultrasound and combinations thereof.

4. The three-dimensionally structured fiber fabric according to claim 1, the shrunk fabric includes at least one of a woven fabric, a knit fabric, a netting, an interlaid scrim, parallelly arranged monofilaments, a staple fiber, a multifilament yarn and a nonwoven fabric.

5. The three-dimensionally structured fiber fabric according to claim 3, wherein the shrunk fabric includes a nonwoven fabric.

6. The three-dimensionally structured fiber fabric according to claim 1, wherein the nonwoven fabric layers include staple fibers.

7. The three-dimensionally structured fiber fabric according to claim 1, the fiber fabric having a mass per unit area of 40 to 300 g/m².

8. The three-dimensionally structured fiber fabric according to claim 1, wherein the nonwoven fabric layers include at least one of fibers of thermoplastic polymers, fibers of polyolefins, fibers of polyesters, viscose fibers, fibers made from renewable resources, and blends thereof.

9. The three-dimensionally structured fiber fabric according to claim 1, further comprising a fluid.

10. The three-dimensionally structured fiber fabric according to claim 9, wherein the fluid includes at least one of water and an oil/water emulsion.

* * * * *